United States Patent [19]

Fox

[11] Patent Number: 4,722,375

[45] Date of Patent: Feb. 2, 1988

[54] TRIGGER LOCK FOR FUEL PUMP NOZZLES

[76] Inventor: Richard W. Fox, 9681 Crest View Cir., Villa Park, Calif. 92667

[21] Appl. No.: 889,422

[22] Filed: Jul. 23, 1986

[51] Int. Cl.⁴ .............................................. F16K 35/00

[52] U.S. Cl. ...................................... 141/392; 251/90; 220/DIG. 33; 74/526

[58] Field of Search ............... 74/526; 70/456 R, 458; 251/89, 90; 141/392; 220/DIG. 33; 222/41, 74, 153, 192

[56] References Cited

U.S. PATENT DOCUMENTS

| | | | |
|---|---|---|---|
| 3,621,691 | 11/1971 | Leopoldi | 70/459 |
| 4,175,595 | 11/1979 | Noe | 141/1 |
| 4,200,128 | 4/1980 | Pokrzywa | 141/392 |
| 4,200,943 | 5/1980 | Fredin et al. | 141/392 X |
| 4,201,253 | 5/1980 | Maloney | 141/392 |
| 4,216,807 | 8/1980 | Diamond | 141/392 |
| 4,245,682 | 1/1981 | Agnew, Sr. | 141/392 |
| 4,275,776 | 6/1981 | Rehkopf | 74/526 X |
| 4,278,116 | 7/1981 | Opp | 251/90 X |
| 4,334,560 | 6/1982 | Lockwood | 141/392 |
| 4,544,007 | 10/1985 | Abraham | 220/DIG. 33 |

*Primary Examiner*—F. J. Bartuska
*Assistant Examiner*—Michael S. Huppert
*Attorney, Agent, or Firm*—Howard R. Lambert

[57] ABSTRACT

A trigger lock for fuel pump nozzles at service stations comprises a relatively thin, flat piece of plastic, wood, metal, rubber or other material formed to have four pairs of opposing side edge regions. Opposite side edge regions are spaced apart different distances for different pairs so that the lock can be used to hold the nozzle triggers of different types of nozzles in a "full-on" pumping position, different pairs of side edge regions being used for nozzles having different trigger strokes. Preferably the spacings are 2¼, 2½, 2¾ and 3 inches to enable use with most nozzles used by independent fuel distributors, by major distributors and for pumping No. 2 diesel fuel. In a variation, the trigger lock is incorporated into a vehicle fuel cap, the lock functioning as the portion by which the cap is gripped to remove and install the cap. In another variation, the intersecting corners of the side edge regions are rounded and the curved side edge is fluted or "coined" to provide a non-slip surface enabling the lock to stay in locking relationship with a nozzle trigger.

14 Claims, 6 Drawing Figures

TRIGGER LOCK FOR FUEL PUMP NOZZLES

BACKGROUND OF THE INVENTION

1. Field of the Invention

The present invention relates generally to the field of fuel pump nozzles and more particularly to apparatus for keeping such nozzles triggered on while pumping fuel.

2. Discussion of the Prior Art

Within the past decade, at least in the United States, the number of self-service gasoline stations has very greatly increased. In the face of steeply increased costs of crude oil and the resistance on the part of motorists to high prices of gasoline and automotive diesel fuel, station operators and owners have substantially reduced most of the customary services provided to motorists. Only rarely are service stations to be found which do not have self-service islands where, for a reduced price of often many cents per gallon, motorists can pump their own gasoline or diesel fuel. Moreover, in many regions of relatively high crime or where convenience stores have replaced the service bays, all of the pump islands are self service.

As an obvious consequence, more and more motorists, men and women alike, are pumping their own gasoline or automotive diesel fuel. For many motorists, the pumping of their own gasoline or diesel fuel is at least an annoyance and at worst a tedious and sometimes dangerous task.

Before the recent prevalence of self-service islands in gasoline stations, most pump nozzles were equipped with some type of releasable trigger lock which could be activated by the operator to hold the nozzle trigger in the "on" or pumping position. By locking the pump nozzle trigger in the on position, the service station attendant could leave the nozzle in a vehicle gas tank filler neck and have the tank being filled while other services were being performed. The nozzles were so constructed that when the vehicle fuel tank was filled to about full, back pressure would shut the nozzle off even with the trigger locked in the on (pump) position. To pump additional fuel, for example, to "top off" the tank, the nozzle trigger had to be unlocked and released and again moved to the on position.

However, for reasons not entirely clear, as previously "full" service stations were entirely or partially converted to "self-serve" stations, many service station operators removed or deactivated the pump nozzle trigger locks. As a consequence, most motorists who now often have little choice but to pump their own gasoline or diesel fuel, must stand by their vehicle tank filler neck while keeping the nozzle trigger squeezed on until the fuel tank is filled.

As above mentioned, keeping the nozzle trigger held to the on position for the entire time the fuel tank is being filled is tedious to most persons. However, to many women motorists or many motorists who have certain physical disabilities, such as arthritis in their hands, the task of keeping the nozzle trigger held on is difficult and sometimes impossible.

Some motorists attempt to keep the pump nozzle trigger in the on position by wedging or jamming the vehicle fuel tank cap under the trigger. However, fuel caps are made in a great variety of sizes and shapes and none have heretofore, to the knowledge of the present inventor, been specifically shaped to function as a nozzle trigger lock. As a result, gas caps used for such purposes tend to slip out of place, for example, as a result of pumping surges caused by simultaneous operation of other pumps in the same service station, and may be damaged or roll under the vehicle causing other problems.

In other situations, some motorists may use "make-shift" nozzle trigger locks which work with some fuel pump nozzle triggers but not with others or may not have satisfactory means for keeping the make-shift trigger locks readily at hand.

For these and other reasons, the present inventor has developed a general purpose trigger lock for fuel pump nozzles. the trigger lock being configured for use with several different, known, pump nozzle types, including diesel fuel pump nozzles.

SUMMARY OF THE INVENTION

A trigger lock for fuel pump nozzles, according to the present invention, comprises a comparatively rigid member having a first pair of opposing side edge regions which are spaced generally a distance, $D_1$, apart and a second pair of opposing side edge regions which are spaced generally a distance $D_2$ apart. The distances $D_1$ and $D_2$ are substantially different and are substantially equal to corresponding "full-on" nozzle trigger locking distances $S_1$ and $S_2$ of first and second types of pump nozzles.

In an embodiment, the trigger lock has a third pair of opposing side-edge regions which are spaced generally a distance, $D_3$, apart, the distance $D_3$ being substantially equal to a corresponding "full-on" nozzle trigger locking distance, $S_3$, of a third type of pump nozzle and a fourth pair of opposing side edge regions which are spaced generally a distance, $D_4$, apart, the distance $D_4$ being substantially equal to a corresponding "full-on" nozzle trigger locking distance, $S_4$, of a fourth type of pump nozzle.

It is preferred, but not necessary, that the distance $D_1$ is about 2.25 inches, the distance $D_2$ is about 2.5 inches, the distance $D_3$ is about 2.75 inches and the distance $D_4$ is about 3.0 inches.

The opposing side edge regions of at least one of the first, second, third and fourth pairs of side edge regions are flat and are mutually parallel. Moreover, the mutually parallel side edge regions of the at least one of the pairs of side edge regions overlap one another by at least about 0.5 inches. It is, however, preferred that the opposing side edge regions of each of the first, second, third and fourth pairs of side edge regions are mutually parallel and that the mutually parallel side edge regions of each of the first, second, third and fourth pairs of opposing side edge regions overlap one another by at least about 0.5 inches.

In another embodiment, the opposing side edge regions of at least one of the first, second, third and fourth pairs of side edge regions are arcuate. More preferably in such embodiment, the opposing side edge regions of each of the first, second, third and fourth pairs of opposing side edge regions are arcuate. When the side edge regions are arcuate, it is, moreover, preferred that the side edges are fluted so as to help retain the nozzle lock in a trigger locking relationship in a fuel pump nozzle.

Advantageously, a use instruction label may be provided, as are means for adhering the label to the member. Also, means may be provided for enabling the member to be used as a key fob.

In another variation, the nozzle trigger lock includes means configured for sealably closing the filling opening of a vehicle fuel tank filler neck and means for connecting the member to the closing means so that the member forms an external, manually grippable portion and the closing means form a fuel cap. Accordingly, the member forms an external, manually grippable portion of the cap by means of which the cap can be rotated between locked and unlocked positions relative to the fuel tank filler neck.

BRIEF DESCRIPTION OF THE DRAWING

The present invention can be better understood by a consideration of the accompanying drawing in which.

DESCRIPTION OF THE PREFERRED EMBODIMENT

Figure 1:
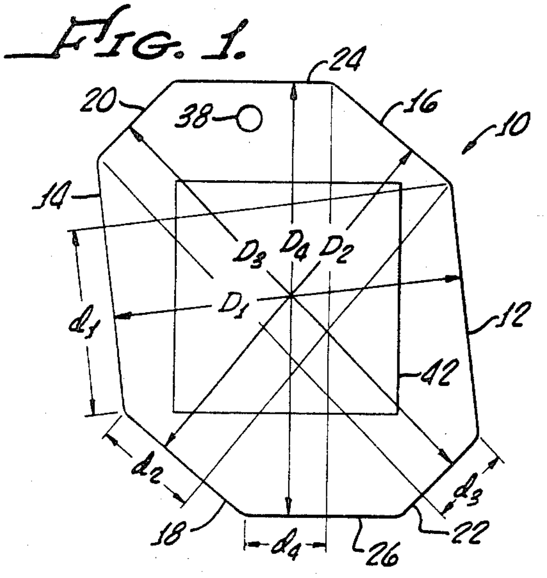
FIG. 1 is a plan view of a general purpose nozzle trigger lock in accordance with the present invention.

There is shown in FIG. 1, relatively to size and scale and according to the present invention, a trigger lock 10 for a fuel pump nozzle. Trigger lock 10 preferably comprises a flat plate which may, for example, have a thickness of from about ⅛ inch to about ½ inch, although the invention is not so limited. In plan-view, and as shown, trigger lock 10 has eight (8) sides 12, 14, 16, 18, 20, 22, 24 and 26.

Configuration of trigger lock 10 is such that sides 12 and 14 are mutually parallel, sides 16 and 18 are mutually parallel, sides 20 and 22 are mutually parallel and sides 24 and 26 are mutually parallel and also such that the distance between each pair of parallel sides 12 and 14, 16 and 18, 20 and 22, and 24 and 26 are different. The least spacing $D_1$ is between sides 12 and 14, the spacing $D_2$ between sides 16 and 18 being greater than $D_1$, the spacing $D_3$ between sides 20 and 22 being greater than $D_2$ and the spacing $D_4$ between sides 24 and 26 is greater than $D_3$.

Figure 2:
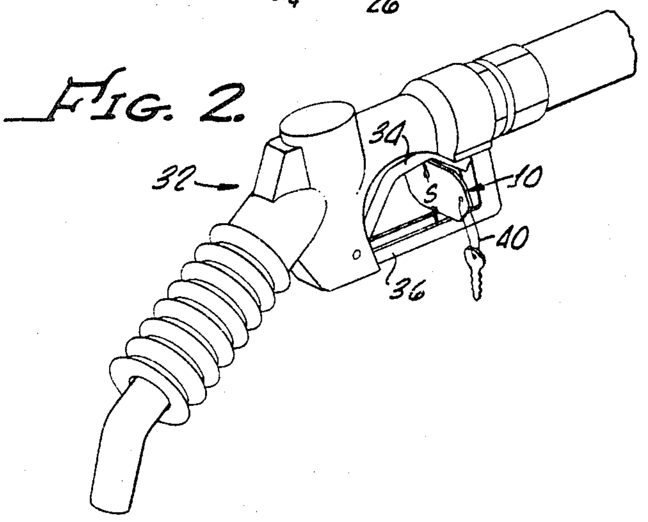
FIG. 2 is a drawing showing the manner in which the nozzle trigger lock of FIG. 1 is used.

The present inventor has determined that various types of fuel pump nozzles are in use (the term fuel being used generically to include both gasoline and No. 2 diesel fuel used in automobiles), and that these different types of nozzles have different "full-on" nozzle trigger locking distances, S, (FIG. 2).

Nozzle trigger lock 10 has accordingly been constructed so that the above-described, parallel side separation distances, $D_1$–$D_4$, correspond to the "full-on" nozzle trigger locking distances, S,–$S_4$ used in the prevailing types of pump nozzles. Accordingly, the shortest distance, $D_1$, between sides 12 and 14, is selected to be equal to the "full-on" trigger locking distance $S_1$ of the types of nozzles typically used by independent station operators. In turn, the respective distances $D_2$ and $D_3$ between sides 16 and 18 and between sides 20 and 22 are the locking distances $S_2$ and $S_3$ typically associated with the types of pump nozzles used by major gasoline and diesel fuel distributors. Finally, distance, $D_4$, between sides 24 and 26 corresponds to the "full-on" trigger locking distance, $S_4$, provided by most diesel nozzles.

By way of example, with no limitations thereby intended or implied, the parallel side separation distances may be as shown below in Table I.

TABLE I

| Distance | Inches |
|---|---|
| $D_1$ | 2.25 |
| $D_2$ | 2.5 |
| $D_3$ | 2.75 |
| $D_4$ | 3.0 |

Besides sides 12 and 14, 16 and 18, 20 and 22, and 24 and 26 being parallel to one another, in order for trigger lock 10 to stay in place as a trigger lock in a nozzle 32, between an operating trigger 34 and a nozzle frame 36 (FIG. 2), it has been determined by the present inventor that the sides in each pair of parallel sides should overlap one another by at least about 0.5 inches. The amount of overlap is determined by drawing a perpendicular line from the overlapped end of one side in a parallel pair to the other side of the parallel pair. Thus, as can be seen in FIG. 1, when perpendicular lines are drawn in this manner, sides 12 and 14 overlap one another by a distance $d_1$, sides 16 and 18 overlap one another by a distance $d_2$, sides 20 and 22 overlap one another by a distance $d_3$ and sides 24 and 26 overlap one another by a distance $d_4$. As shown, the overlap distances $d_1$–$d_4$, for the side separation distances given in Table I are substantially as shown below in Table II.

TABLE II

| Overlap Distance | Inches |
|---|---|
| $d_1$ | 1.25 |
| $d_2$ | .625 |
| $d_3$ | .562 |
| $d_4$ | .562 |

As a result of providing four differently spaced apart pairs of sides 12 and 14, 16 and 18, 20 and 22, and 24 and 26 as well as providing the above-described overlap of at least about 0.5 inches, trigger lock 10 has a slightly skewed twisted appearance when seen in a plan view (FIG. 1)

Trigger lock 10 can advantageously be provided in a number of different ways. As shown in FIG. 1, lock 10 may be constructed having an aperture 38 relatively adjacent to one narrow end region so that the lock may be attached to a key chain 40, partially shown in phantom lines, as a key fob. When so configured, lock 10 may be ornamented in any of a number of ways, for example, with initials, pictures, slogans, ball team emblems, advertising names or logos, to name only a few of the possibilities. Thus, lock 10 may serve the dual function of being a nozzle trigger lock and an advertising or decorative item, When, as may be the case, lock 10 is constructed of plastic, it may advantageously be a promotional or "give away" item. Also, advantageously, a decal 42 may be adhered to one side of lock 10, such decal providing instructions on the manner in which the lock is to be used. In place of decal 42, or on the other side of lock 10, a VELCRO "hook" strip may be attached to enable the lock to be stuck to any fabric region of a vehicle or to a piece of mating VELCRO strip which is attached to a convenient location in the vehicle.

It has presently been determined that in order to have the above-described nozzle lock readily available for use in self-serve service stations, a fuel cap 50 (FIGS. 3 and 4) can readily be constructed which has, for a gripping portion, a comparatively thicker nozzle trigger lock 10*a* which forms an integral part of the fuel cap. Otherwise, fuel cap 50 may be generally conventional in construction, having a circular sealing gasket 52 and a projecting, tab-type cap locking portion 54; a venting portion 56 may also be provided. Lock 10*a*, which also functions as a gripping "handle" of cap 50, may be attached to cap locking portion 54 by a plurality of screws or rivets, or in any other manner. To assist in removing cap 50, especially in tight filler neck regions of some vehicles, a projecting finger grip 66 (shown in FIG. 4) may be formed as part of lock 10*a* or be connected to an outer side 64 of lock 10*a*. As a result, lock 10*a* will always be conveniently available, and serves the dual function of being both a nozzle trigger lock and a fuel cap "handle." As a fuel cap handle, especially for vehicles having an exposed fuel cap, nozzle trigger lock 10*a* may be constructed of a chrome-plated metal, of polished aluminum or a colored plastic, and may be variously decorated or embossed.

Figure 5:
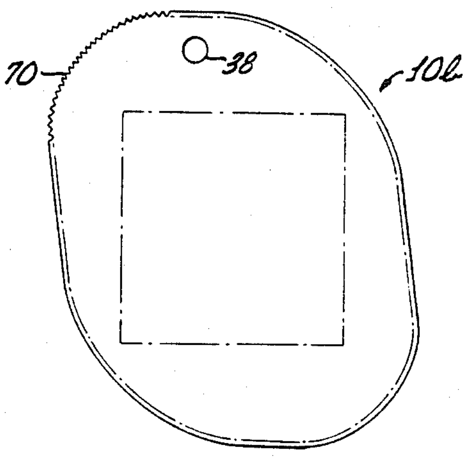
FIG. 5 is a plan view of a variation nozzle trigger lock which is similar to the trigger lock of FIG. 1 except that the corners thereof are rounded off and the edges are fluted or serrated.
Figure 6:
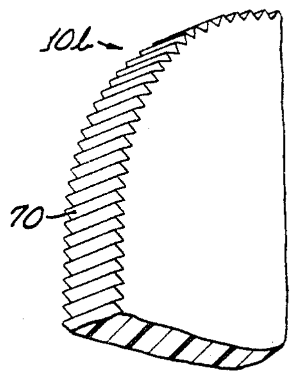
FIG. 6 is a partial perspective drawing of the variation trigger lock of FIG. 5, showing fluting of edge regions to provide for lock gripping.

Although the opposing, parallel sides 12 and 14; 16 and 18, 20 and 22, and 24 and 26 (FIG. 1) have been found by the present inventor to enable trigger lock 10 (and also lock 10*a* of fuel cap 50) to be easily retained in trigger locking position in nozzle 32 (FIG. 2), similar advantages can be obtained with the variation nozzle trigger lock 10*b* shown in FIGS. 5 and 6. As particularly shown in FIG. 5, side surfaces 12, 14, 16, 18, 20, 22, 24 and 26 may be rounded off at intersections thereof so as to form a relatively smoothly arcuate side edge 70. Accordingly, trigger lock 10*b* has the general shape of a skewed oval.

To enable lock 10*b* to be retained in whatever trigger locking position may be appropriate for the type of nozzle 32 involved, side edge 70 may be fluted or "coined" as shown in FIG. 6. Such fluting of side edge 70 may, for example, be particularly helpful if trigger lock 10*b* is constructed of a metal, wood or a relatively hard plastic, such that the spring forces normally encountered with nozzle triggers may cause locks 10*b* to "pop" out of position if edge 70 were smooth. If, however, lock 70 were to be constructed of a softer, pliable plastic such that nozzle trigger 34 and nozzle frame 36 would each tend to slightly impress themselves into the lock, fluting of the edge may be eliminated. It is to be appreciated that when using a softer, slightly pliable plastic from which to construct lock 10*b*, a plastic would ordinarily be selected which had slightly elastic properties so that any indentations made in edge 70 by trigger 34 and frame 36 would only be temporary. As an alternative to the use of a softer plastic, a rubber material, such as neoprene, could advantageously be used. It should also be appreciated that the fluting of lock edge 70 may be narrow and deep or shallow, or broad and relatively shallower, the edge in the latter case having a scalloped appearance.

Figure 3:
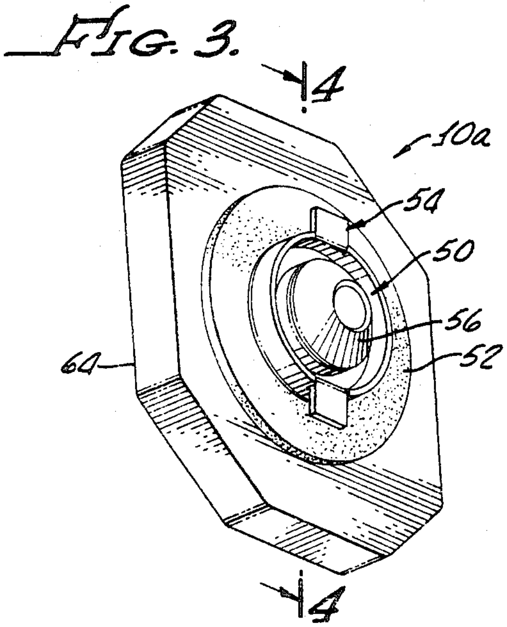
FIG. 3 is a perspective drawing showing incorporation of the nozzle trigger lock of FIG. 1 into a vehicle fuel cap
Figure 4:
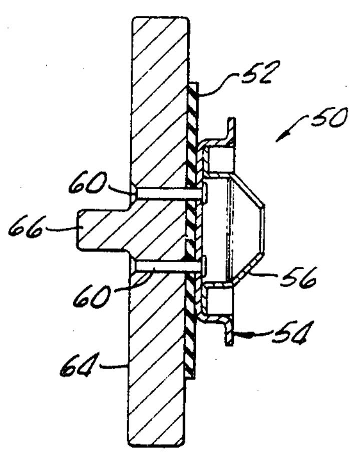
FIG. 4 is a cross-sectional view taken along line 4—4 of FIG. 3, showing the manner in which the trigger lock is incorporated into the fuel cap.

Lock 10*b* can, of course, be alternatively used for the construction of a fuel cap, similar to fuel cap 50 (FIG. 3). It is also to be appreciated that lock 10, 10*a*, 10*b* can be inserted in different positions in nozzles having large trigger strokes, such as diesel fuel nozzles, so that the trigger can be held in different, partial-on positions.

Thus, although a particular embodiment and variations of a trigger lock for a fuel nozzle, including a variation in which the trigger lock is incorporated into a fuel cap, are described for the purpose of illustrating the manner in which the invention may be used to advantage, it is to be appreciated that the invention is not limited thereto. Accordingly, any and all variations, or modifications which may occur to those skilled in the art are to be considered to be within the scope and spirit of the invention as defined in the appended claims.

What is claimed is:

1. A trigger lock for a fuel pump nozzle comprises a flat, comparatively rigid member which has generally a skewed octagonal shape and having a first pair of opposing side edge regions which are spaced generally a distance, $D_1$, apart, a second pair of opposing side edge regions which are spaced generally a distance, $D_2$, apart, a third pair of opposing side edge regions which are spaced generally a distance, $D_3$, apart and a fourth pair of opposing side edge regions which are spaced generally a fourth distance, $D_4$, apart, the distances $D_1$, $D_2$, $D_3$ and $D_4$ being substantially different and being substantially equal to corresponding "full-on" nozzle trigger locking distances $S_1$, $S_2$, $S_3$ and $S_4$ of first, second, third and fourth types of pump nozzles.

2. The trigger lock as claimed in claim 1 wherein the distance $D_1$ is about 2.25 inches, the distance $D_2$ is about 2.5 inches, the distance $D_3$ is about 2.75 inches and the distance $D_4$ is about 3.0 inches.

3. The trigger lock as claimed in claim 1 wherein the opposing side edge regions of at least one of the first, second, third and fourth pairs of side edge regions are flat and are mutually parallel.

4. The trigger lock as claimed in claim 1 wherein the opposing side edge regions of each of the first, second, third and fourth pairs of side edge regions are mutually parallel.

5. The trigger lock as claimed in claim 1 wherein the opposing side edge regions of at least one of the first, second, third and fourth pairs of side edge regions are arcuate.

6. The trigger lock as claimed in claim 1 wherein the opposing side edge regions of each of the first, second, third and fourth pairs of opposing side edge regions are arcuate.

7. The trigger lock as claimed in claim 1 wherein the side edges of the member are fluted so as to help retain the nozzle lock in a trigger locking relationship in a pump nozzle.

8. The trigger lock as claimed in claim 1 including means configured for sealably closing the filling opening of a vehicle fuel tank filler neck and means for connecting said rigid member to said closing means so that said member and said closing means form a fuel cap, the member forming an external, manually grippable portion of said cap by means of which the cap is rotated between locked and unlocked positions relative to said fuel tank filler neck.

9. A trigger lock for a fuel pump nozzle comprises a comparatively rigid member having a first pair of opposing side edge regions which are spaced generally a distance, $D_1$, apart, a second pair of opposing side edge regions which are spaced generally a distance, $D_2$, apart, a third pair of opposing side edge regions which are spaced generally a distance, $D_3$, apart and a fourth pair of opposing side edge regions which are spaced generally a fourth distance, $D_4$, apart, the distances $D_1$, $D_2$, $D_3$ and $D_4$ being substantially different and being substantially equal to corresponding "full-on" nozzle trigger locking distances $S_1$, $S_2$, $S_3$ and $S_4$ of first, second third and fourth types of pump nozzles, the opposing side edge regions of at least one of the first, second, third and fourth pairs of side edge regions being flat and mutually parallel, the mutually parallel side edge regions of said at least one of the pairs of side edge regions overlapping one another by at least about 0.5 inches.

10. A trigger lock for a fuel pump nozzle comprises a comparatively rigid member having a first pair of opposing side edge regions which are spaced generally a distance, $D_1$, apart, a second pair of opposing side edge regions which are spaced generally a distance, $D_2$, apart, a third pair of opposing side edge regions which are spaced generally a distance, $D_3$, apart and a fourth pair of opposing side edge regions which are spaced generally a fourth distance, $D_4$, apart, the distances $D_1$, $D_2$, $D_3$ and $D_4$ being substantially different and being substantially equal to corresponding "full-on" nozzle trigger locking distances $S_1$, $S_2$, $S_3$ and $S_4$ of first, second third and fourth types of pump nozzles, the opposing side edge regions of each of the first, second, third and fourth pairs of side edge regions being mutually parallel and the mutually parallel side edge regions of each of the first, second, third and fourth pairs of opposing side edge regions overlapping one another by at least about 0.5 inches.

11. A trigger lock for a fuel pump nozzle comprising:

(a) detachable sealing means for sealing a filler neck opening of a vehicle fuel tank; and (b) a manually grippable member connected to said sealing means for enabling the sealing means to be manually installed onto and removed from said filler neck opening, said member having generally a skewed octagonal shape and having a first pair of opposing side edge regions which are spaced generally a distance, $D_1$, apart, a second pair of opposing side edge regions which are spaced generally a distance, $D_2$, apart, a third pair of opposing side edge regions which are spaced generally a distance, $D_3$, apart and a fourth pair of opposing side edge regions which are spaced generally a fourth distance, $D_4$, apart, the distances $D_1$, $D_2$, $D_3$ and $D_4$ being substantially different and being substantially equal to corresponding "full-on" nozzle trigger locking distances $S_1$, $S_2$, $S_3$ and $S_4$ of first, second, third and fourth types of pump nozzles.

12. The trigger lock as claimed in claim 11 wherein the opposing side edge regions of each of the first, second, third and fourth pairs of side edge regions are mutually parallel.

13. The trigger lock as claimed in claim 11 wherein the opposing side edge regions of at least one of the first, second, third and fourth pairs of side edge regions are arcuate.

14. The trigger lock as claimed in claim 11 wherein the opposing side edge regions of each of the first, second, third and fourth pairs of side edge regions are arcuate.

* * * * *